United States Patent [19]

Kaminski

[11] 4,438,572

[45] Mar. 27, 1984

[54] HEAT DUCT SUPPORT ASSEMBLY FOR A FOOD PREPARATION OVEN AND METHOD

[75] Inventor: Daniel S. Kaminski, Fort Wayne, Ind.

[73] Assignee: Lincoln Manufacturing Co., Inc., Fort Wayne, Ind.

[21] Appl. No.: 386,610

[22] Filed: Jun. 9, 1982

[51] Int. Cl.³ ............................................. F26B 15/18
[52] U.S. Cl. ........................................ 34/218; 34/155; 99/447
[58] Field of Search ................. 34/218, 160, 155, 156; 99/447; 239/556, 557, 566, 600; 248/220.2

[56] References Cited

U.S. PATENT DOCUMENTS

| | | | |
|---|---|---|---|
| 3,908,533 | 9/1975 | Fagerstrom et al. | 99/386 |
| 3,964,656 | 6/1976 | Hella | 34/156 |
| 4,154,861 | 5/1979 | Smith | 426/466 |
| 4,377,109 | 3/1983 | Brown et al. | 99/447 |

Primary Examiner—Larry I. Schwartz
Attorney, Agent, or Firm—Albert L. Jeffers; John F. Hoffman

[57] ABSTRACT

A heat duct support assembly for an impingement oven having a plurality of horizontally oriented heat ducts therein, which are connected to a plenum to direct hot air from the plenum against food being conveyed through the oven. The assembly comprises two studs projecting from each of the oven opposite sides and an elongated bracket horizontally positioned between the oven opposite sides for supporting the remote ends of the heat ducts. The bracket is supported by a pair of bracket supports connected to its ends and which are adjacent to the opposite sides of the oven. The bracket supports have slots in their bottom and top edges that engage the studs in order to support the bracket between the oven opposite sides. The opposite ends of the heat ducts are supported by flanges peripherally disposed about openings in the plenum and over which the heat ducts are fitted.

The method comprises providing the studs and bracket with the bracket supports, positioning the bracket in the oven and guiding the slots in the bracket supports in alignment with the studs, and then rotating the bracket to engage the slots with the studs. Thereafter, the heat ducts are fitted over the flanges and the remote ends rested on the bracket.

9 Claims, 15 Drawing Figures

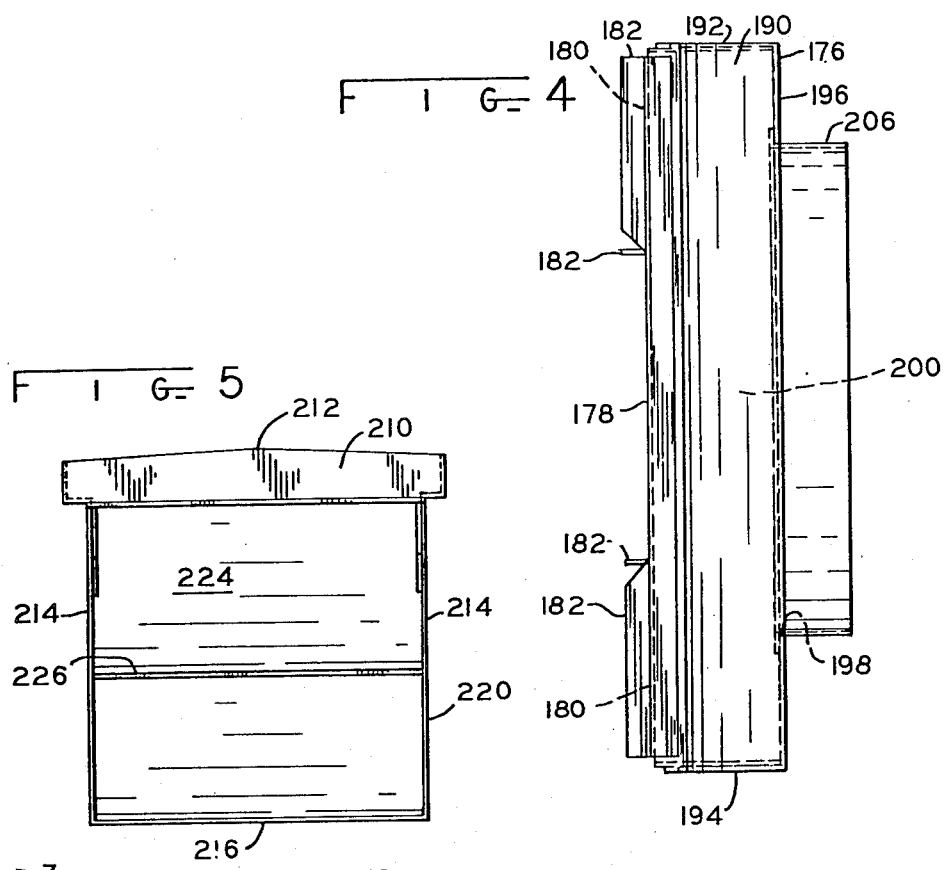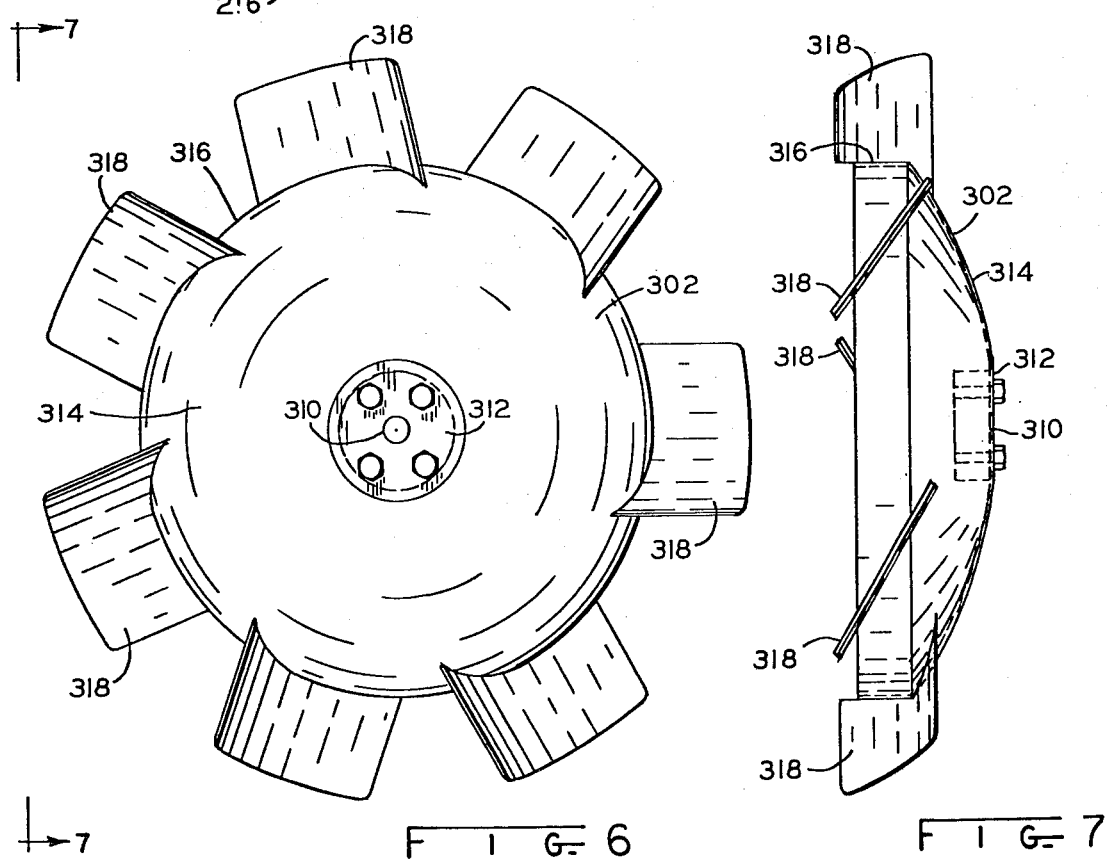

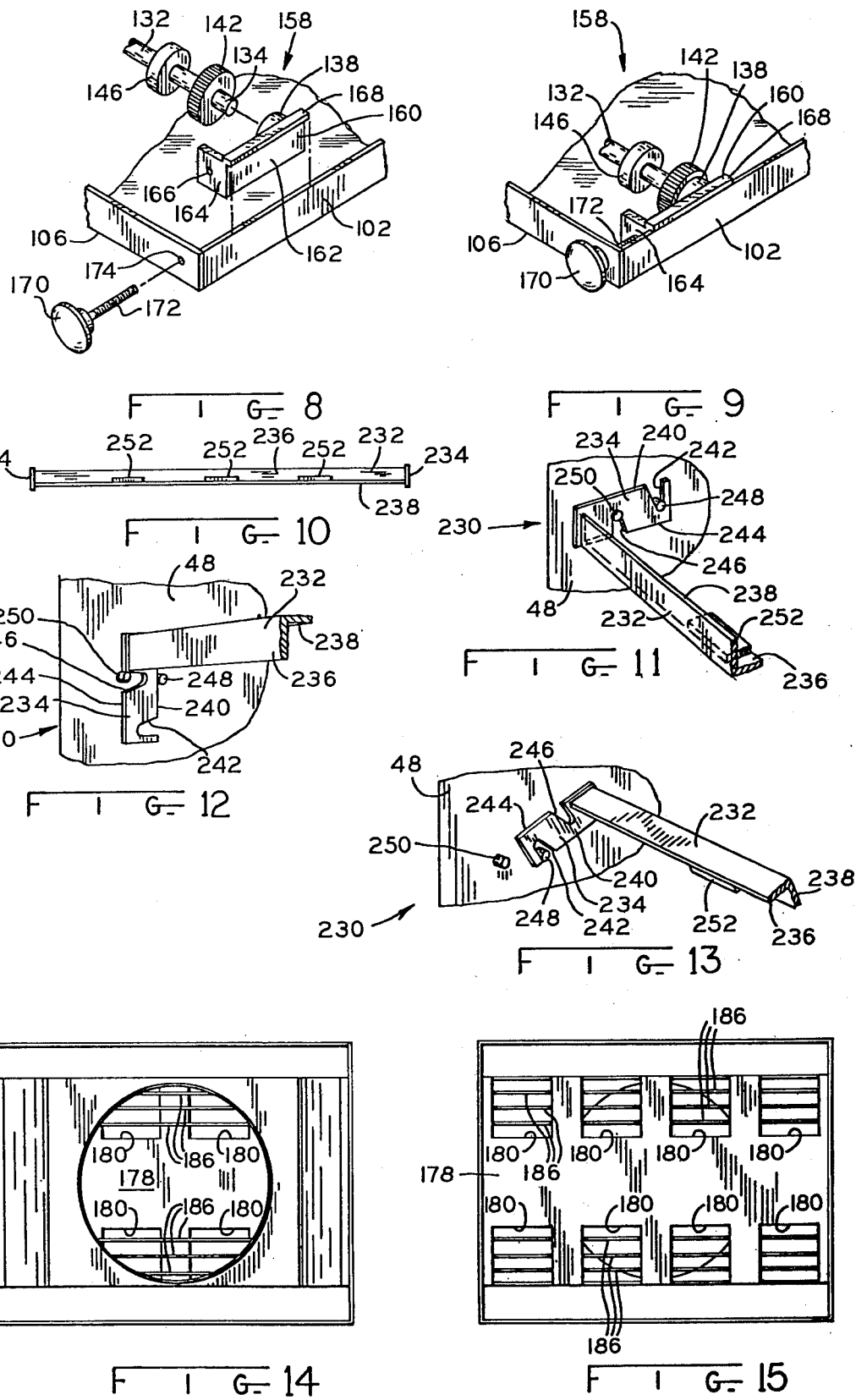

HEAT DUCT SUPPORT ASSEMBLY FOR A FOOD PREPARATION OVEN AND METHOD

BACKGROUND OF THE INVENTION

This invention pertains to a heat duct support assembly, and more particularly to a heat duct support assembly for a food preparation oven having therein a plurality of elongated heat ducts, each of which has a plurality of jets positioned therethrough to direct hot air against food.

Representative of the type of heat ducts mentioned above are those ducts disclosed in U.S. Pat. No. 4,154,861. These and like ducts associated with the preparation of food for human consumption are required to be cleaned after specific intervals of use, and, if necessary to be removed prior to cleaning, to be removed manually without use of tools in accordance with NSF (National Sanitation Foundation) Standard 2, which also requires installation of such components to be manually made without tools.

SUMMARY OF THE INVENTION

The present invention provides a heat duct support assembly and method wherein the heat ducts may be easily removed and installed manually for cleaning or replacement, and wherein a majority of the support assembly also may be easily removed manually for cleaning.

The present invention is particularly useful in those food preparation ovens having a plenum with a plurality of openings and heat ducts extending horizontally from the openings for receiving from the plenum hot air for subsequent impingement upon food to be cooked. The heat duct support assembly of the present invention provides for the heat ducts to be easily removed manually by providing a peripherally disposed flange about each of the plenum openings and a horizontally disposed elongated bracket spaced apart from the plenum for supporting the remote ends of the heat ducts.

An individual heat duct is installed by inserting one end about the flange of a plenum opening and resting the remote opposite end on the elongated bracket. Preferably, the duct end is inserted over the flange so as to prevent the escape of hot air between the interfacing of the heat duct and the plenum. Because the heat duct remote opposite end is supported on the bracket, it may be easily removed by lifting the remote end up and drawing the heat duct from about the plenum opening flange, thus satisfying the requirement of Standard 2 of NSF for manual removal for cleaning.

In addition, the elongated support bracket is uniquely constructed so as to be easily removed manually, thereby also satisfying Standard 2. The elongated bracket has on each of its ends a bracket support having one slot in its bottom edge and another second slot in its top edge. Mounted on opposite sides within the oven are a pair of studs about which each of the bracket supports are rotated so as to engage the slots with respective ones of the studs, thereby supporting the bracket between the oven opposite sides in a spaced apart manner from the plenum openings. The bracket is easily removed manually by grasping it and rotating it in an opposite direction to disengage each of the slots from a respective stud and then withdrawing the bracket from the oven interior.

One of the distinct advantages of supporting the bracket by use of slots and studs is the ease with which the bracket may be mounted. Because the slots taper outwardly toward their respective bracket support edges and have widths thereat greater than the widths or diameters of the studs, the initial positioning of the bracket supports so as to align the slots with the studs requires a lesser degree of accuracy than if the slots did not taper and had widths only slightly greater than widths or diameters of the studs.

In broader aspects of this invention, there is provided a heat duct support assembly for a food preparation oven having a plurality of heat ducts horizontally disposed therein, each of which includes a plurality of jets for directing hot air onto food to be cooked. The heat duct support assembly comprises an elongated bracket horizontally disposed between studs projecting from opposite sides within the oven. Connecting the bracket ends to the studs are a pair of bracket supports having slots engaging respective studs so as to support the bracket between the oven opposite sides. The bracket supports the remote ends of the heat ducts, which have their opposite ends removably supported about the openings in a plenum.

The present invention also provides a method for supporting the heat ducts comprising the steps of providing stud members on opposite sides within the oven and supplying an elongated bracket having bracket supports at each end. Each of the bracket supports has a first slot disposed in its bottom edge and a second slot disposed in its top edge, with the second slot being further from the bracket than the first slot. The bracket is then positioned within the oven with the bracket supports in abutment with the oven opposite sides, the bracket supports are guided into alignment with the respective studs, and then the bracket is rotated to cause the slots to engage respective studs, thereby removably supporting the bracket between the oven opposite sides. The heat ducts are then supported within the oven by having their respective ends removably mounted about respective plenum openings and their remote opposite ends rested on the bracket.

It is an object of the present invention to provide a heat duct support assembly and method which allow easy installation and removal of heat ducts within a food preparation oven.

Another object of the present invention is to provide a heat duct support assembly and method which allow easy installation and removal manually of heat ducts within a food preparation oven in accordance with NSF Standard 2.

A further object of the present invention is to provide a heat duct support assembly easily installed and removed manually for cleaning or other purposes.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein:

FIG. 4 is a side elevational view of a plenum of a preferred embodiment of the present invention;

FIG. 5 is an end elevational view of a duct of a preferred embodiment of the present invention;

FIG. 6 is a front elevational view of an impeller of a preferred embodiment of the present invention;

FIG. 7 is a side elevational view of the impeller of FIG. 6;

FIG. 8 is an exploded view of the adjusting mechanism of a preferred embodiment of the present invention;

FIG. 9 is a perspective view of the adjusting mechanism of FIG. 8;

FIG. 10 is an elevational view of a finger bracket of a preferred embodiment of the present invention;

FIG. 11 is a partially broken-away, perspective view of an end of a finger bracket depicting its connection to a side of a preferred embodiment of the present invention;

FIG. 12 is a partially broken-away, perspective view of an end of a finger bracket illustrating its position for removal or installation to a side of a preferred embodiment of the present invention;

FIG. 13 is a partially broken-away, perspective view of an end of a finger bracket illustrating the initial position for installing it to a side of a preferred embodiment of the present invention;

FIG. 14 is a rear elevational view of the interior of a preferred embodiment of the present invention with the impeller and motor assemblies removed; and FIG. 15 is a front elevational view of the interior of a preferred embodiment of the present invention with the finger ducts, and impeller and motor assemblies removed.

DESCRIPTION OF A PREFERRED EMBODIMENT

Figure 1:
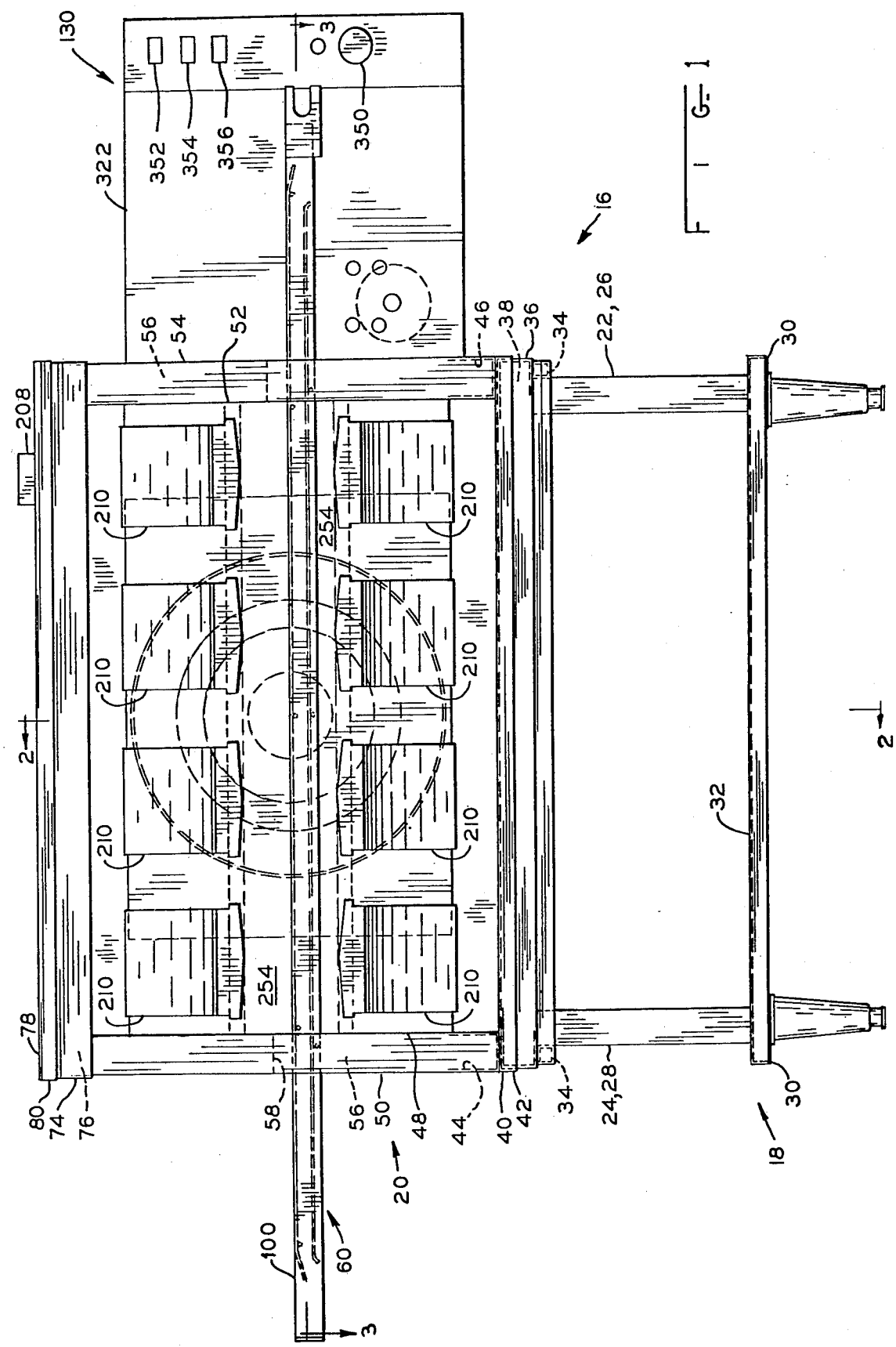
FIG. 1 is a front elevational view of a preferred embodiment of the present invention.
Figure 2:
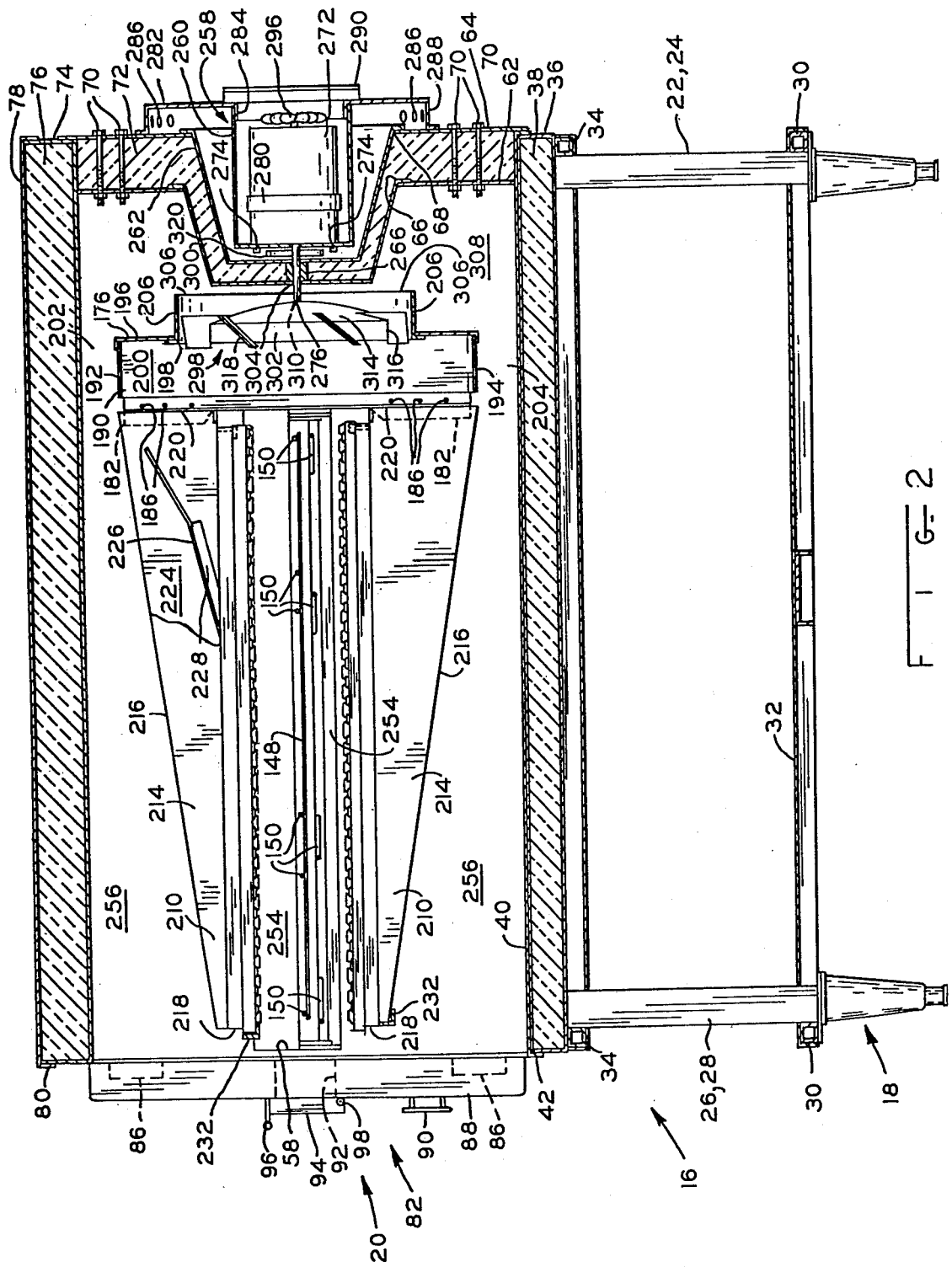
FIG. 2 is a sectional view of FIG. 1 along line 2—2 and viewed in the direction of the arrows.

Referring to FIGS. 1 and 2, food preparation apparatus 16 of the present invention is illustrated with stand assembly 18 and cabinet assembly 20. Stand assembly 18 comprises four leg members 22, 24, 26, 28, which may be made of square tubular stainless steel, secured within a bottom frame 30, which also may be made of tubular stainless steel. Leg members 22, 24, 26, 28 are secured within respective corners of bottom frame 30 in any suitable manner such as by welding. Bottom frame 30 further has shelf 32 secured thereto, by welding for example. Secured to the top ends of leg members 22, 24, 26, 28, again preferably by welding, is top frame 34, also preferably made of tubular stainless steel. Placed upon top frame 34 is bottom insulation housing 36 containing any suitable insulation material 38 therein. Parenthetically, unless otherwise indicated, further securements or connections may be made in any suitable manner, but are preferably made by welding.

Figure 3:
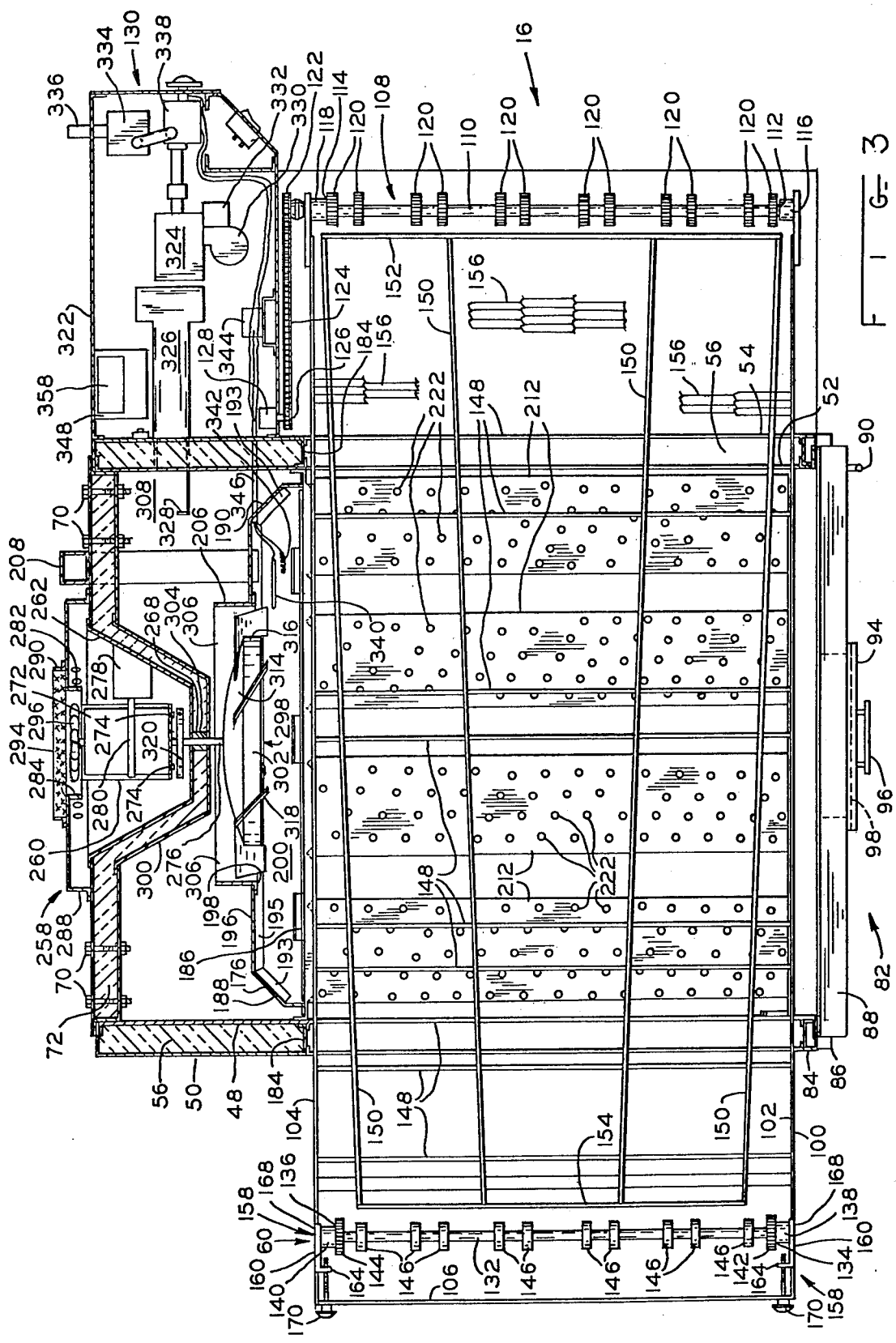
FIG. 3 is a sectional view of FIG. 1 along line 3—3 and viewed in the direction of the arrows.

Referring now to FIGS. 1, 2 and 3, cabinet assembly 20 comprises base cap 40 set upon bottom insulation housing 36 and secured thereto by base cap skirt 42, which extends downwardly from the periphery of base cap 40 and over bottom insulation housing 36 such that skirt 42 is contiguous therewith. Base cap 40 may be made by stamping a stainless steel sheet and then welding the corners together in order to form skirt 42. Two connecting, U-shaped channel brackets 44, 46 are secured along respective longitudinal edges of base cap 40, with channel bracket 44 having inner wall 48 and outer wall 50 connected thereto and channel bracket 46 having inner wall 52 and outer wall 54 connected thereto. Inner wall 48 and outer wall 50 are riveted to channel bracket 44, while inner wall 52 and outer wall 54 are riveted to channel bracket 46. Each of the walls 48, 50, 52, 54 is made of stainless steel sheeting, and insulation material 56 is disposed between inner wall 48, outer wall 50 and inner wall 52, outer wall 54. A passageway 58 is also horizontally disposed through walls 48, 50, 52, 54 so that conveyor assembly 60 may be received therethrough.

The rear portion of cabinet assembly 20 comprises an inner wall 62 and an outer wall 64, which have their bottom edges secured to base cap 40 and their side edges secured to inner walls 48, 52, and are further strengthened for supporting other assemblies by fasteners such as nut and bolt assemblies 70 received through holes (not shown) in walls 62, 64. Walls 62, 64 also have openings 66, 68 disposed therethrough, respectively, with opening 66 having a slightly larger diameter than opening 68, and an insulation material 72 is positioned between walls 62, 64 for energy conservation.

The top portion of cabinet assembly 20 comprises top insulation housing 74 having insulation material 76 therein and which is secured to walls 48, 50, 52, 54 by welding, riveting, or the like. Placed on top of insulation housing 74 is top cap 78, which has skirt 80 extending downwardly from its periphery and contiguous with the sides of insulation housing 74. Housing 74 and top cap 78 are preferably made of stainless steel sheeting.

The interior of cabinet assembly 20 is accessible by door assembly 82. Door assembly 82 comprises elongated hinge frame 84, which is secured along the forward edges of inner wall 48, outer wall 50 and which has secured thereto hinge 86. Hingedly connected to hinge 86 is door 88, which has handle 94 permitting door 88 to be opened and closed, and has door opening 92 disposed therein for allowing quick, easy access to the interior of cabinet assembly 20. Access door 94 having an access door handle 96 is hingedly connected to the bottom periphery of door opening 92 by access door hinge 98. One of the purposes of access door 94 is to allow the insertion or removal of certain foods within cabinet assembly 20, and in order to facilitate such purpose access door 94 may be provided with a window made of a transparent material. Neither door 88 or access door 94 utilize a gasket to seal with the front of cabinet assembly 20 or door opening 92, respectively. Doors 88, 94 are constructed and machined such that the metal-to-metal seal is sufficient for energy conservation purposes.

Reference should be made now to FIGS. 1, 2, 3, 8, and 9 for a description of conveyor assembly 60. Conveyor frame 100 is received through cabinet passageway 58 and removably mounted to walls 48, 50, 52, 54 and has opposite sides 102, 104 with end 106 extending between and connected to sides 102, 104 and shaft assembly 108 extending between the opposite ends of sides 102, 104. Shaft assembly 108 comprises a horizontally disposed shaft 110 having shaft journal ends 112, 114 rotatably received within journal hubs 116, 118, respectively, which are secured to sides 102, 104, respectively. Shaft 110 has a plurality of drive gears 120 secured thereto for driving a conveyor belt mounted within conveyor frame 100, while shaft journal end 114 is rotatably received through frame side 104 in order to support drive sprocket 122, which is connected thereto. Shaft 110 carrying drive gears 120 thereon is rotated by chain 124 engaging drive sprocket 122 and sprocket 126 which is operated by motor 128 located within control center 130.

Extending between sides 102, 104 of conveyor frame 100 and opposite shaft assembly 108 is horizontally disposed idler shaft 132 having journal ends 134, 136 rotatably received within journal hubs 138, 140, respectively, which are slidably mounted to sides 102, 104, respectively. On either end of idler shaft 132 and inwardly adjacent to journal ends 134, 136 are drive gears 142, 140, respectively, which are similar to drive gears 120. Extending the length of idler shaft 132 between drive gears 142, 144 are a plurality of blank gears 146 about which a conveyor belt may be disposed. Further support for a conveyor belt is provided by two rows of a plurality of cross rods 148 extending between and secured to frame sides 102, 104, and two rows of a plurality of support rods 150 placed upon and secured to cross rods 148 and which generally extend a portion of the length of conveyor frame 100. The ends of support rods 150 are maintained in a spaced apart relation and supported by rod ends 152, 154 secured thereto. FIGS. 1, 2 and 3 more clearly show the two vertically spaced planes defined by the interconnecting cross rods 148 and support rods 150, while FIG. 3 illustrates the support rods 150 tapering inwardly from shaft assembly 108 to idler shaft 132 for assisting drive gears 142, 144 in centering and tracking a conveyor belt moving upon support rods 150.

A preferred conveyor belt is a wire-link conveyor belting 156, which is placed over shaft 110 and idler shaft 132 and upon the two planes of support rods 150 such that drive gears 120 of shaft 110 and drive gears 142, 144 of idler shaft 132 engage and drive belting 156 upon chain 124 and sprocket 126 being actuated by motor 128.

The slack or tension of belting 156 about shaft assembly 108 and idler shaft 132 may be uniquely adjusted by adjusting mechanism 158 located on conveyor frame end 106. Particularly referring to FIGS. 8 and 9, a single adjusting mechanism 158 is illustrated at the juncture of frame end 106 and frame side 102, and since an identical adjusting mechanism 158 is located at the juncture of frame end 106 and frame side 104 only one such adjusting mechanism 158 will be described. As earlier explained, journal end 134 of idler shaft 132 is rotatably received within journal hub 138, which is secured to L-shaped bracket 160. L-shaped bracket 160 has a bracket side 162 which engages with and conforms to the inner surface of frame side 102, a bracket end 164 perpendicularly connected to an end of bracket side 162 and with threaded hole 166 disposed therethrough, and a flange 168 perpendicularly disposed along the top edge of bracket side 162 and engaging with and conforming to the top edge surface of frame side 102 for supporting L-shaped bracket 160 thereon. Also provided with adjusting mechanism 158 is adjusting knob 170 having a threaded portion 172 receivable through frame end hole 174 and threadedly engaged through hole 166. With an identical adjusting mechanism 158 positioned on the opposite end of frame end 106, the slack or tension of belting 156 may be adjusted by operating adjusting knob 170 counterclockwise or clockwise in order to slide L-shaped bracket 160 along frame side 102. L-shaped brackets 160 are prevented from being sidetracked or bounced off of frame side 102 by the weight of idler shaft 132 and belting 156 on flange 168.

For visual appeal, conveyor guards (not shown) may be mounted about conveyor frame 100 in order to hide from view the operating parts of conveyor assembly 60 and adjusting mechanisms 158. It should also be obvious that conveyor assembly 60 may be adapted to other conveyor systems or work benches in order to provide further flexibility of preparing food products, but in any event, it is preferable that conveyor assembly 60 extend outwardly from passageway 58 a sufficient distance in order to allow a food product to be properly positioned upon belting 156 for conveyance through cabinet assembly 20 and removed from the opposite end of conveyor assembly 20.

Referring now to FIGS. 2, 3, 4, 14 and 15, plenum 176 has a plenum front wall 178 connected to inner walls 48, 52, by welding, pop riveting or any other suitable manner. In FIGS. 2 and 15, it can be seen that front wall 178 has a vertical dimension less than the interior vertical dimension of cabinet assembly 20 and a plurality of openings 180 disposed therethrough, each of which has flanges 182 peripherally disposed thereabout. Front wall 178 may be stamped from a sheet material such as stainless steel. Side supports 184 are placed between and secured to inner wall 48, outer wall 50, and inner wall 52, outer wall 54, in order to provide additional support for plenum 176 and other assemblies described hereinafter, and a plurality of such side supports 184 may be positioned at other points for additional structural integrity. A grating 186 having a surface area substantially the same as front wall 178 is positioned against front wall 178 on a side opposite flanges 182 for purposes of protection while cleaning the plenum 176. Attached to the side edges of front wall 178, or to inner walls 48, 52 at the point of juncture with front wall 178, are plenum sides 188, 190, both of which taper inwardly at their rearward portions. Plenum 176 also has top wall 192 and bottom wall 194 secured to plenum sides 188, 190, for example, by welding or pop riveting top wall 192 and bottom wall 194 to flanges 193 disposed inwardly along the top and bottom peripheries of plenum sides 188, 190; and has back wall 196 secured to the peripheries of plenum sides 188, 190 and top and bottom walls 192, 194 in a similar manner utilizing back wall flanges 195. Hole 198, which is centrally disposed through back wall 196, and openings 180 provide air flow into and out of plenum chamber 200, which is formed by front wall 178, sides 188, 190, top and bottom walls 192, 194, and back wall 196. In addition, top wall 192 and top insulation housing 74, and bottom wall 194 and bottom insulation housing 36, form therebetween passageways 202, 204, respectively. An important feature associated with plenum 176 and the air flow within cabinet assembly 20 is collar 206, which extends axially along the periphery of back wall hole 198 a predetermined distance. Its purpose and the manner in which it fulfills that purpose will be described hereinafter. To allow escape of combustion and other foreign particles within cabinet assembly 20, flue 208 is provided and communicates with plenum chamber 200 and the atmosphere external of cabinet assembly 20. Again, all of the elements associated with plenum 176 are preferably made of stainless steel sheeting.

Referring now to FIGS. 1–5, 10–13, and 15, duct fingers 210 will be described, which description may be found in more detail in U.S. Pat. No. 4,154,861 incorporated herein by reference. Generally each finger 210 comprises a jet plate 212 slidably received between two generally triangularly shaped sides 214, which are connected to a sloping side 216, whereby fingers 210 have a tapering shape from front end 218 to back end 220.

Fingers 210 are preferably made of stainless steel sheeting, and sides 214 and sloping side 216 may be stamped out of a single stainless steel sheet. Jet plate 212 has a plurality of jet openings 222 disposed therein to provide communication between finger chamber 224 and the interior of cabinet assembly 20. Openings 222 are formed such that the high velocity air exits in a jet stream, and additional jet plates (not shown) may be slidably received within finger chamber 224 in order to define more precisely the jet air streams exiting openings 222. Naturally, additional jet plates 212 having openings 222 would be positioned within finger chamber 224 such that openings 222 of each jet plate 212 would be vertically aligned with other respective openings 222. Referring to FIGS. 2 and 15, positioned within each finger chamber 224 is deflector 226. Each deflector 226 has a width approximately equal to the interior width of finger 210 and has one end spot welded within finger chamber 224 to sides 214. Each deflector 226 has a pair of flanges 228 extending from its side edges toward jet plate 212 from the front edge of deflector 226, which is secured to sides 214, to a point approximately midway along deflector 226. This portion of deflector 226 is stationary, while the remaining portion is movable in order to apportion the incoming air flow within chamber 224. As can be seen in FIG. 2, deflector 226 has its front edge secured to sides 214 at a point approximately one-third of the distance from back end 220. Without deflectors 226, air leaving plenum chamber 200 and entering finger chamber 224 would move directly to the front portion of the fingers 210 due to its high velocity. In order to prevent this occurrence, each deflector 226 deflects a portion of the incoming air flow through those openings 222 which lie in the back one-third portion of each finger 210. This permits the heated, high velocity air to exit all openings 222 in a uniform distribution across jet plate 212 in order to evenly cook food products carried by conveyor assembly 60.

Referring now to FIGS. 1 and 15, openings 180 of plenum front wall 178 are disposed therein such that upon finger back ends 220 being positioned thereagainst, fingers 210 extend horizontally about the portion of conveyor assembly 60 within cabinet assembly 20; specifically, four of the fingers 210 are spaced above and four of the fingers 210 are spaced below that portion of conveyor assembly passing through cabinet assembly 20. This arrangement allows the food product being carried by conveyor assembly 60 to be evenly cooked in a shorter period of time due to the impingement of the heated, high velocity air exiting openings 222 of jet plates 212.

While the specific construction of fingers 210 may be found in U.S. Pat. No. 4,154,861, the connection of fingers 210 within cabinet assembly 20 is unique to the present invention. Referring in particular to FIGS. 2, 3, 4, 5, 10-13 and 15, each opening 180 within plenum front wall 178 has flanges 182 extending outwardly therefrom, which support a finger back end 220 by fitting back end 220 about flanges 182 so that the outer surfaces of flanges 182 are contiguous with the inner surfaces of finger back end 220. Finger front ends 218 are supported by a novel finger support assembly 230 illustrated more clearly in FIGS. 10-13. Two finger support assemblies 230 are required, one for the top four fingers 210 and one for the bottom four fingers 210, portions of which are depicted in FIG. 2. Finger support assembly 230 comprises finger bracket 232 extending generally horizontally between inner walls 48, 52 and having bracket ends 234 disposed thereon. When installed, finger bracket 232 has horizontal edge 236 and vertical side 238 for supporting finger front ends 218 thereon. The primary novelty of finger support assemblies 230 resides in the structure by which finger bracket 232 and bracket ends 234 may be removed by hand from inner walls 48, 52. FIGS. 11-13 depict only a portion of finger bracket 232 having a single bracket end 234 thereon, and only that portion will be described since the opposite end is identical thereto. Bracket end 234 has a top edge 240 with a shaped slot 242 therein and bottom edge 244 with shaped slot 246 therein; slot 242 being a greater distance from bracket 232 than slot 246. Slots 242, 246 taper outwardly toward their respective edges for installation purposes. Secured to inner wall 48 are two studs, inner stud 248 and outer stud 250. FIG. 11 depicts finger bracket end 234 installed with studs 248, 250 received within slots 242, 246, respectively. In order to remove finger bracket 232 manually, finger bracket 232 is rotated about a point on bracket end 234 generally midway between slots 242, 246 to a position depicted in FIG. 12. Thereafter, finger bracket 232 may be vertically or horizontally drawn between studs 248, 250 for removal and cleaning. The initial step in reinstalling finger bracket 232 is depicted in FIG. 13 wherein finger bracket 232 is rotated to a position as shown so that inner stud 248 begins to be received by slot 242. At this point, as depicted in FIG. 13, finger bracket 232 is then rotated toward the operator so as to engage outer stud 250 with slot 246, as depicted again in FIG. 11. Finger bracket 232 is designed to be manually removed for cleaning in accordance with NSF (National Sanitation Foundation) Standard 2, which requires that such parts of food preparation apparatuses be removable without the use of other tools. Once installed, as depicted in FIGS. 2 and 11, finger front ends 218 are supported by horizontal edge 236 and vertical side 238, and individual front ends 218 of fingers 210 are maintained in a spaced apart relation by three spacers 252 welded upon horizontal edge 236. The number of spacers 252 required is a direct function of the number of fingers 210 required such that for every n number of fingers there is n-1 number of spacers. As described above, an individual finger 210 is removably supported at its back end 220 by flanges 182 of plenum 176 and at its front end 218 by finger bracket 232.

Alternate embodiments of supporting finger bracket 232 utilizing the above description may be easily designed. For example, studs 248, 250 may be replaced by a single, vertically disposed rectangular stud having a rounded top edge, and slots 242, 246 may be replaced by a single, vertically disposed slot having a rounded top portion and a bottom portion which tapers outwardly toward bottom edge 244. In this embodiment, finger bracket 232 would be easily installed by initially placing the tapered vertical slot over the rectangular stud and then lowering bracket end 234 in order to allow the rectangular stud to firmly seat within the rectangular slot. Although this particular embodiment performs satisfactorily, the first embodiment utilizing studs 248, 250 and slots 242, 246 is preferred because it is more easily manufactured and produced.

In order to provide flexibility in preparing certain food products, closeoff caps (not shown) may be utilized on the finger back ends 220 in order to prevent heated, high velocity air flow from entering finger chambers 224. For example, should a food product require only top surface heating, four close-off plates would be utilized on the four fingers 210 beneath conveyor assembly 60, or, if a food product requires both top and bottom surface heating for only a short period of time, closeoff plates may be utilized on the first two fingers 210 above and the first two fingers 210 below conveyor assembly 60.

With the above description of fingers 210 within cabinet assembly 20, two additional chambers are formed, the first being cooking chamber 254 defined between the four top fingers 210 and the four bottom fingers 210 and through which conveyor assembly 60 passes, and the second being return chamber 256 defined between fingers 210, inner walls 48, 52, insulation housings 36, 74, and door 88, the functions of which will be described hereinafter.

Motor assembly 258 will now be described with reference to FIGS. 2 and 3. Secured to the periphery of opening 68 of outer wall 64, by welding or pop riveting, for example, is a frustoconically shaped interior shroud 262 having hole 266 centrally disposed therethrough. Secured through hole 266 is isolator tube 268. Motor 272 is mounted on motor bracket 260 by four studs 274 and has shaft 276 rotatably received through hole 266. Further support of motor 272 is provided by angle offset bracket 278, which is spot welded to a side of interior shroud 262, and band 288 received through angle offset bracket 278 and secured about motor 272. Band 280 and angle offset bracket 278 serve to dampen linear and torsional stresses set up by the starting and rotating torques of motor 272.

Cylindrically-shaped motor shroud 282 is concentrically secured about motor 272 to motor bracket 260 and rear shroud 288, by welding or pop riveting for example, and has an opening 284 centrally disposed therethrough with a diameter greater than the width or diameter of motor 272 and vents 286 disposed through the upper and lower portion of rear shroud 288. Concentrically mounted about motor shroud opening 284 and secured to rear shroud 288 is fan shroud 290. A vent 294 is provided at the top and bottom of fan shroud 290, and a fan 296 is rotatably connected to motor shaft 276, whereby, upon motor 272 being actuated, fan 296 draws outside air through vent 294 and motor shroud opening 284 for cooling motor 272 and subsequent exhausting through vents 286 in rear shroud 288.

Referring now to FIGS. 2-4, 6, 7 and 14, impeller assembly 298 comprises in major part impeller shroud 300 and impeller 302. Impeller shroud 300, like shroud 262, is formed by spinning a stainless steel sheet into a frusto-conical shape, and is connected to inner wall opening 66, by welding or pop riveting, such that it encompasses interior shroud 262. Motor shaft 276, which is rotatably received through isolator tube 268, is also rotatably received through impeller shroud hole 304, which is centrally disposed through the flat surface portion of impeller shroud 300, and insulation material 72 fills the space defined between impeller shroud 300, interior shroud 262, and isolator tube 268. As seen in FIGS. 2 and 3, impeller shroud 300 extends toward the space defined by collar 206 thereby defining therebetween passageway 306, which allows communication between heat chamber 308 and plenum chamber 200.

Shaft 276, which extends within collar 206, has connected to its end portion impeller 302 by split shaft bushing 310 or an equivalent thereof. Impeller 302 is made of spun stainless steel and, referring to FIGS. 6 and 7, has flat center portion 312, a convexly-shaped surface area 314 extending from flat center portion 312, and skirt 316, which extends from the periphery of domed surface area 314 and is substantially parallel to the axis of impeller 302. Important to the unique results obtained by impeller assembly 298 is the positioning of impeller 302 in relation to collar 206 and plenum 176. Generally, impeller 302 is positioned within collar 206 in order to obtain good air flow distribution.

Blades 318 have a flat surface and are welded, riveted, or spot welded to impeller 302 such that blades 318 form an angle of approximately 35° with the vertical, and are tilted opposite the direction of rotation of impeller 302, which rotates clockwise relative to the position of motor assembly 258. The angle of tilt of blades 318 is generally between 4° and 8°, and, as seen in FIG. 6, there are seven blades 318. Impeller shroud 300 and collar 206 direct the air flow through passageway 306 in a path substantially parallel to the side of the impeller shroud 300. The frusto-conical shape of impeller shroud 300 provides smooth, continuous air flow, thereby eliminating any dead spots or stagnant air pockets within heat chamber 308. The air is thereafter drawn by impeller 302 through passageway 306 for uniform distribution through plenum 200 to fingers 210. The uniform distribution of heated, high pressure air is provided by domed surface area 314 of impeller 302, which smoothly directs the air flow axially and radially to blades 318 for further axial and radial distribution through plenum 200 to fingers 210. In addition to the axial, radial distribution of air by impeller 302, it further reduces air buffeting and noise associated with spider-type fans.

FIGS. 2 and 3 illustrate impeller 302 positioned on shaft 276 such that domed surface area 314 faces toward motor assembly 258, however, acceptable results may also be obtained by reversing impeller 302 on shaft 276 so that domed surface area 314 faces toward plenum 176 in a direction opposite motor assembly 258. However, best results and smoothest air flow are obtained when impeller 302 is positioned as indicated in FIGS. 2 and 3.

For energy conservation purposes, heat conductor 320 is connected to and rotates with shaft 276 between interior shroud 262 and motor bracket 260. Heat conductor 320 is preferably made of material such as aluminum, which absorbs heat energy from shaft 276 and distributes it out through rear shroud vents 286.

Referring now to FIGS. 1 and 3, control 130 of the present invention will be explained. The control components are housed in control center housing 322, which is secured, by welding or pop riveting, to outer wall 54 of cabinet assembly 20. Positioned within control center housing 322 is burner head 324 and burner housing 326, which supply and direct the flame to heat chamber 308, where flame shaper 328 forms the flame into an appropriate shape. The flame is located within the bottom portion of heat chamber 308 and has its heat energy drawn transversely across heat chamber 308 by impeller 302 for reheating recirculated air flow. Other elements, for example, orifices and gas piping, are not illustrated since they are conventionally associated with power gas burners. Air is supplied to burner head 324 by burner fan 330 controlled by burner control 332, which regulates the temperature of the heat source within heat chamber 308. In order to regulate the temperature of the heat source within heat chamber 308, burner control 332 is connected to electric valve 334, which in turn is connected to gas inlet pipe 336 and modulating control 338. Electric valve 334 is a conventional-type valve and supplies gas flow to modulating control 338, which regulates the gas flow supply to burner head 324. Modulating control 338 is able to mechanically regulate gas flow to burner head 324 by inputs received from thermostat bulb 340, which is located within plenum chamber 200. Thermostat bulb 340 is able to sense the temperature of the rapid air movement within plenum chamber 200 and to provide input to modulating control 338. Upon receiving inputs from thermostat bulb 340, modulating control 338 is adjusted in order to provide the appropriate amount of gas for burner head 324 in order to maintain the desired temperature within heat chamber 308. Furthermore, because of the sensitivity of thermostat bulb 340, the rapid turnover of heated air within heating chamber 308 and gas flow adjustments to burner head 324 are able to be quickly made in order to maintain a desired cooking temperature within cooking chamber 254.

A safety device for the air heating source is air switch 344, which senses the air pressure in plenum chamber 200 through tube 346 which communicates therebetween. If, for some reason, impeller 302 would not be rotating during operation of motor 272, air switch 344 would sense decreased air pressure within plenum chamber 200 and cause burner 324 to shut down.

Earlier, motor 128 was described as providing variable speed to wire-link conveyor belting 156. This regulation is provided by motor control 348, which is controlled by conveyor speed control switch 350. Since motor 128 is preferably a DC shunt wound type motor, it requires an AC-DC convertor such as motor control 348.

On/off switches are provided on the front of control center housing 322, and they are impeller switch 352, burner switch 354, and conveyor switch 356. A safety feature incorporated with control center 130 is relay 358, which is connected to impeller switch 352. In order to provide electrical power to control center 130 and the components therein, impeller switch 352 must first be placed to the on position in order to actuate relay 166, which in turn supplies power to the remainder of the control components. Alternate heat sources are naturally available to the present invention, and a gas power burner is not intended to be a limitation, for example, an electrical heat source is also adaptable to the invention in order to reheat recirculated air flow. Also, the present invention is described as having various elements made of stainless steel sheeting, however, other materials are also acceptable, such as aluminized steel or porcelainized steel.

Referring to FIG. 2, a description of the path of air flow during its recirculation within cabinet assembly 20 will be described. Initially, heated, high velocity air at a temperature of approximately 500° is jetted through jet plate openings 222 of fingers 210 to cooking chamber 254 for direct impingement on the bottom and top of a food product carried by conveyor assembly 60. After impinging the food product, the air flow circulates between fingers 210 into return chamber 256, from which it is drawn by impeller 302 through passageway 202, 204, into heating chamber 308. The recirculated air is then reheated within heating chamber 308 and rapidly drawn through passageway 306 to plenum chamber 200. The temperature within fingers 210 is generally within plus or minus 20° of plenum temperatures approximately 500° F., however, due to rapid air movement through fingers 210, the temperature of the air impinging the food product is generally 500° F. plus or minus 4°. To reiterate an important feature of the present invention, the air flow entering heat chamber 308 is drawn through passageway 306 by impeller 302 in a path substantially parallel to the side of impeller shroud 300 by reason of collar 206 and impeller shroud 300. In order to provide the axial and radial air flow from an impeller such as impeller 302, a length of approximately two to three feet of direct air travel in front of impeller 302 is generally required. The present invention eliminates that requirement of a two to three foot length in front of impeller 302 by providing collar 206, impeller shroud 300, and plenum 200, which perform the same function within a space of approximately four to six inches.

While this invention has been described as having a specific embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. In a food preparation oven having therein mounted a plenum with a plurality of openings therethrough, and a plurality of heat ducts horizontally disposed from and in communication with said plenum through respective ones of said openings, each of said heat ducts including a plurality of jets positioned therein to direct hot air onto food to be cooked, a support assembly for said heat ducts, comprising:

two stud members, a first one projecting from a side of said oven and a second one projecting from an opposite side of said oven, an elongated bracket being horizontally disposed between said oven opposite sides and supporting remote ends of said heat ducts, a pair of bracket supports being connected to respective ends of said bracket adjacent respective ones of said oven opposite sides, said bracket supports each having a slot therein engaging a respective stud member, whereby said bracket is removably supported by said studs between said oven opposite sides, and means for supporting opposite ends of said heat ducts over respective ones of said plenum openings.

2. The assembly of claim 1 wherein said slots are disposed in respective bottom edge portions of said bracket supports, said bracket supports each further having a second slot disposed in a respective top edge portion thereof, said second slots being a greater distance from said bracket than said first mentioned slots, and further including third and fourth stud members projecting from respective oven opposite sides and being engaged by respective ones of said second slots, whereby removal of said bracket is accomplished by rotating said bracket supports to disengage said slots from respective said stud members, and installation of said bracket is accomplished by rotating said bracket in an opposite manner to engage said slots with respective said stud members.

3. The assembly of claim 2 wherein said supporting means includes a plurality of flange members peripherally disposed about respective ones of said plenum openings with said opposite ends of said heat ducts being fitted over respective ones of said flange members.

4. The assembly of claim 3 wherein said slots have outer edge portions that taper outwardly so that the maximum widths of said tapered slot outer portions are greater than width of respective said stud members to allow initial alignment of said slots with respective said stud members to be easily accomplished, and wherein said slots have inner portions with widths just slightly greater than widths of respective said stud members to provide firm engagement between said slots and respective said stud members.

5. The assembly of claim 4 further including spacers being attached to said bracket and separately positioned between respective said remote ends of said heat ducts, said spacers having widths approximately equal to the distance between respective ones of said plenum openings to maintain proper alignment of said heat ducts with respective said plenum openings.

6. A method of supporting a plurality of heat ducts in a food preparation oven having a plenum positioned between oven opposite sides and with which the heat ducts are in communication through respective openings in the plenum, the heat ducts each having a plurality of jets positioned therein to direct hot air onto the food to be cooked, comprising the steps of:

providing two generally horizontally aligned stud members extending from each of the oven opposite sides, providing an elongated bracket having a bracket support at each end, each of the bracket supports having a first slot in a bottom edge portion and a second slot in a top edge portion, the second slots being a greater distance from the bracket than the first slots, positioning the bracket horizontally between the oven opposite sides with the bracket supports in abutment therewith, guiding the bracket support slots into alignment with respective stud members, rotating the bracket to cause the stud members to enter respective slots to removably connect the bracket between the oven opposite sides, mounting removably ends of the heat ducts over the respective plenum openings, and resting the opposite ends of the heat ducts on the bracket.

7. The method of claim 6 wherein the step of mounting includes providing flange members peripherally about each of the plenum openings, and fitting the ends of the heat ducts over respective flange members.

8. The method of claim 7 wherein the slots have outer portions adjacent the respective bracket support edge portions, that taper outwardly so that the maximum widths of the tapered slot outer portions are greater than widths of the respective stud members to allow initial alignment of the slots with the respective stud members to be easily accomplished, and wherein the slots have inner portions with widths just slightly greater than widths of the respective stud members to provide firm engagement between the slots and the respective stud members.

9. The method of claim 8 further including the step of supplying spacers on the bracket and between the heat duct remote ends, the spacers having widths approximately equal to the distance between the respective plenum openings to laterally support the heat ducts in alignment with their respective plenum openings.

* * * * *